United States Patent [19]

Mikulecky

[11] Patent Number: 4,737,878

[45] Date of Patent: Apr. 12, 1988

[54] OVERLOAD SWITCH

[75] Inventor: Harvey W. Mikulecky, Oconomowoc, Wis.

[73] Assignee: RTE Corporation, Waukesha, Wis.

[21] Appl. No.: 883,084

[22] Filed: Jul. 8, 1986

[51] Int. Cl.[4] .......... H02H 5/04

[52] U.S. Cl. .......... 361/37; 335/35

[58] Field of Search .......... 361/37, 35; 335/37, 335/38

[56] References Cited

U.S. PATENT DOCUMENTS 4,435,690 3/1984 Link et al. .......... 361/37

*Primary Examiner*—Robert S. Macon

[57] ABSTRACT

In a transformer primary circuit breaker having a primary switch for opening and closing the transformer primary circuit, an operating handle mounted exteriorly of the transformer for opening and closing the primary switch, a trip mechanism operatively connected to open the primary switch under fault current conditions, the trip mechanism including a conductive metallic sensor element connected in the primary circuit and having a predetermined Curie temperature and a magnet mounted for movement into engagement with the sensor element and biased to open the primary switch when the temperature of the sensor element approaches the Curie temperature, the improvement comprising a shunt circuit connected to the primary circuit in parallel with the sensor element, a normally closed switch in the shunt circuit, a resistance element for limiting the current passing through the shunt circuit, and a tab mounted on the operating handle for opening the shunt circuit switch, a spring mounted in the operating handle for limiting the motion of the operating handle to thereby close the shunt switch, whereby a portion of the primary current will flow through the shunt circuit when the switch is closed. A bimetal switch can be included in the shunt circuit to open the shunt circuit at predetermined oil temperatures or excessive currents.

14 Claims, 6 Drawing Sheets

OVERLOAD SWITCH

BACKGROUND OF INVENTION

Completely self-protected overhead transformers presently use a secondary breaker to monitor secondary fault current and overload conditions in the transformer and interrupt the secondary current whenever these conditions exceed prescribed limits. A troubleshooter is then sent out to investigate the problem and, if it cannot be corrected immediately, the secondary breaker would be switched into an emergency overload mode before resetting and closing, to allow the transformer to continue operating at a higher temperature until the problem is corrected.

Switching to the emergency overload mode requires a mechanical adjustment of the latch release force for the secondary breaker, thus forcing the bimetal operator to rise to a higher temperature before the latch is released to trip out the secondary breaker.

In the transformer primary circuit breaker which is described in U.S. Pat. No. 4,435,690 issued on March 6, 1984, entitled Primary Circuit Breaker, the secondary overcurrent and/or overload conditions are monitored by a primary circuit breaker. The relatively low primary currents make a bimetal operator impractical. The temperature sensing assembly described in U.S. Pat. No. 4,435,690 includes a magnet having known holding and opening forces which are dependent on the Curie temperature of a sensing element. As the temperature of the sensing element approaches the Curie temperature, the magnet will be released to trip out the primary circuit breaker. The invention provides a means for reducing the current to the element when the transformer is switched to the emergency overload mode.

SUMMARY OF THE INVENTION

The present invention is concerned with an emergency overload switch circuit which bypasses a portion of the primary current passing through the sensor element and can be incorporated directly into a transformer primary circuit breaker of the type shown and described in U.S. Pat. No. 4,435,690. The emergency overload switch circuit is connected to shunt a portion of the primary current from the sensor element in the primary circuit breaker and thereby decrease the sensitivity of the trip system and permit higher temperature operation of the transformer during emergency overload. The emergency overload switch circuit is activated by a lever provided on the circuit breaker assembly handle external to the transformer, which produces a small rotation of the crank mechanism allowing a switch in the shunt circuit to close and thus place the shunt circuit electrically in parallel with the sensor element.

An optional feature of the invention would be to allow the shunt circuit to operate during short time high overloads, but to restore normal sensing if the transformer oil temperature reaches levels indicating possible insulation degradation. This can be accomplished by adding a bimetal switch in the shunt circuit so that it responds only to the oil temperature, and opens the shunt circuit at a preset temperature.

IN THE DRAWINGS

DESCRIPTION OF THE INVENTION

Figure 1:
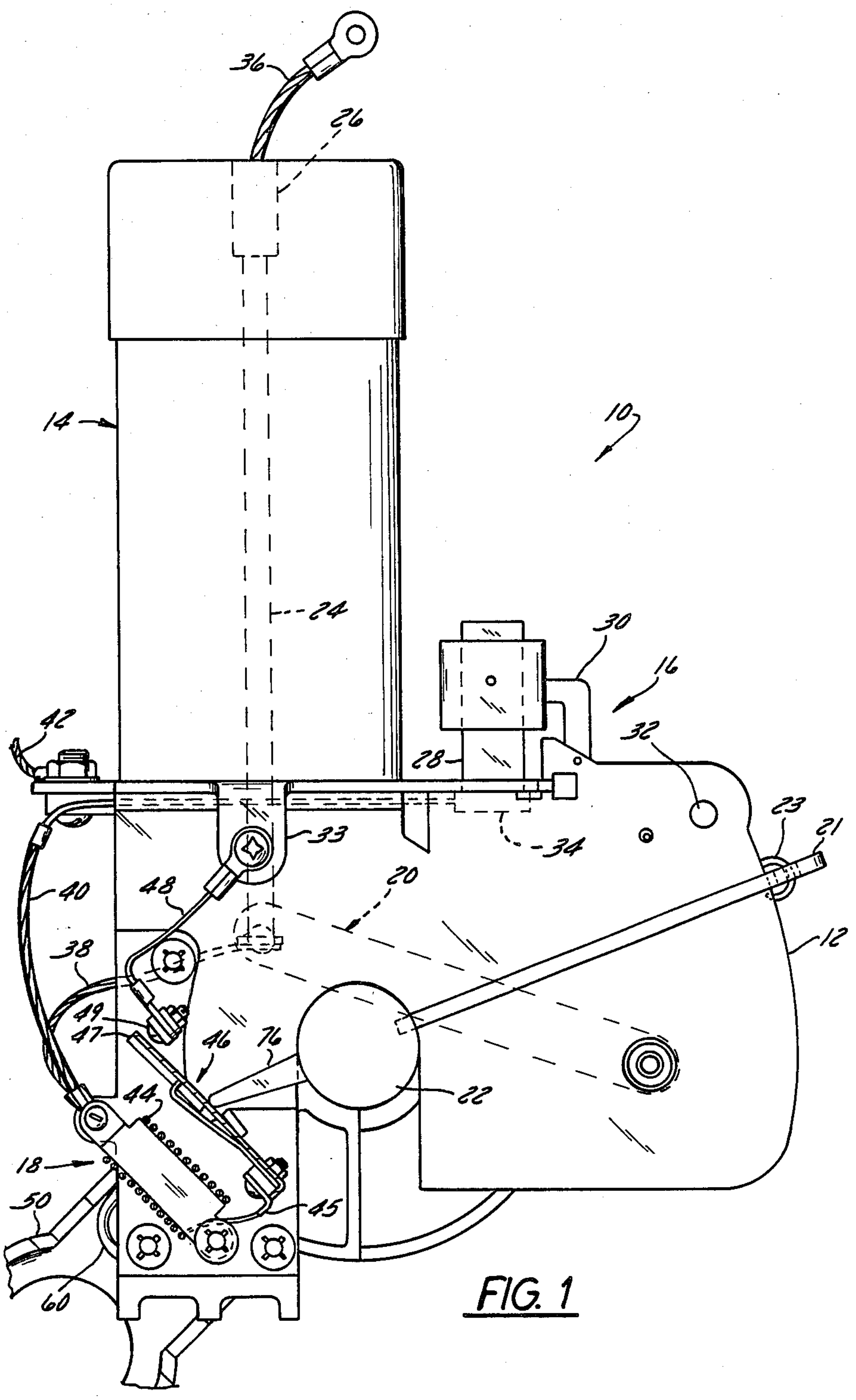
FIG. 1 is a side elevation view of a primary circuit breaker showing the shunt circuit with the switch in the open position.
Figure 2:
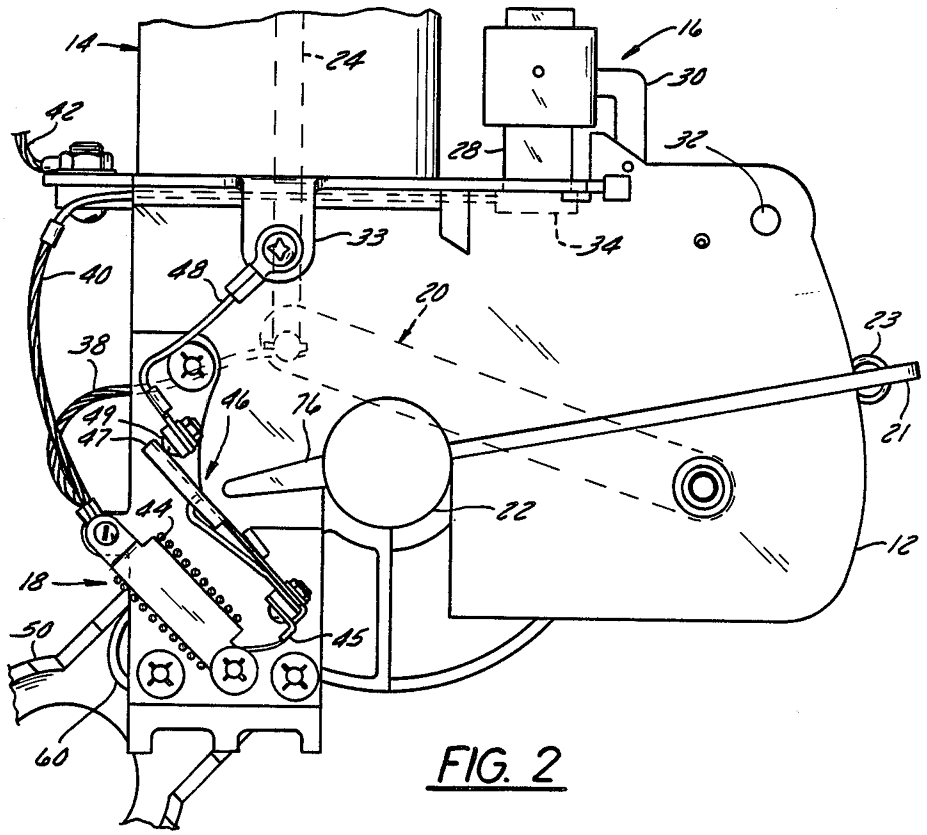
FIG. 2 is a view of a portion of FIG. 1 showing the switch in the shunt circuit in the closed position.

The primary circuit breaker 10 of the type contemplated herein includes a frame or base 12 having an arc extinguishing assembly 14, a temperature responsive trip assembly 16 and a latch mechanism 20 mounted thereon. The shunt circuit assembly 18 according to the present invention is shown mounted on the frame 12 and connected to shunt the sensor of the trip assembly 16. As more fully described in U.S. Pat. No. 4,435,690, which is incorporated herein by reference, the latch mechanism 20, as shown dotted in FIGS. 1 and 2, is moved between open and closed positions by means of yoke 21 mounted on a crank shaft 22. The yoke 21 is connected to the lower end of a movable contact 24 by means of a spring 23. The crank shaft 22 is rotated between open and closed positions to move the movable contact 24 into and out of engagement with a fixed contact 26 in the arc extinguishing assembly 14 as more fully described in U.S. Pat. No. 4,435,690. The trip assembly 16 is used to trip the latch mechanism 20 to release the movable contact 24 from the latch mechanism so that the contact 24 moves away from the fixed contact 26.

In this regard, the trip assembly 16 is temperature sensitive and includes a magnet 28 which is mounted on arm 30 for pivotal movement about pivot pin 32. The magnet 28 is shown in engagement with a fixed metallic electrically conductive sensor element 34 which is connected in series with the movable contact 24 by means of lines 38 and 40. The fixed contact 26 is connected to the primary bushing of the transformer by a line 36. The other end of the element 34 is connected through a plate 33 to the primary coil of the transformer by a line 42. It should be noted at this point that when the contacts 24 and 26 are closed, the circuit will be completed from the incoming line 36 through contacts 26, 24, lines 38, 40 to element 34 through plate 33 to the line 42, which is connected to the transformer. In operation, the element 34 has a predetermined Curie temperature so that the magnet 28 is released from the sensor element 34 when the element temperature approaches the Curie temperature in response to resistance heating of the element associated with a current overload or an increase in oil temperature.

The shunt circuit assembly 18 is connected to the primary circuit in parallel with the sensor element. The assembly 18 is connected to plate 33 and to the line 38 to bypass a portion of the primary current that passes through sensor element 34. The shunt circuit assembly 18 includes a resistance wire 44 connected at one end to the line 38 and at the other end to a switch 46 by a line 45. The switch 46 includes a movable element 47, connected to the line 45 and a fixed contact 49 connected to the plate 33 by a line 48.

In FIG. 1, the switch 46 is shown open so that the element 34 will respond to the full load current on the primary side of the transformer. If the temperature of the element 34 should approach the Curie temperature due to an overload or an increase in the oil temperature, the magnet 28 will release from the element and the latch mechanism 20 will trip open as described in U.S. Pat. No. 4,435,690. In FIG. 2, the switch 46 is shown in the closed position to shunt a portion of the primary current across the element 34. The portion of the current passing through the shunt circuit will depend on the resistance of coil 44, which has been typically selected to shunt approximately 15% of the circuit current. This will reduce the element heating and the temperature, to permit operation under emergency overload conditions.

Figure 3:
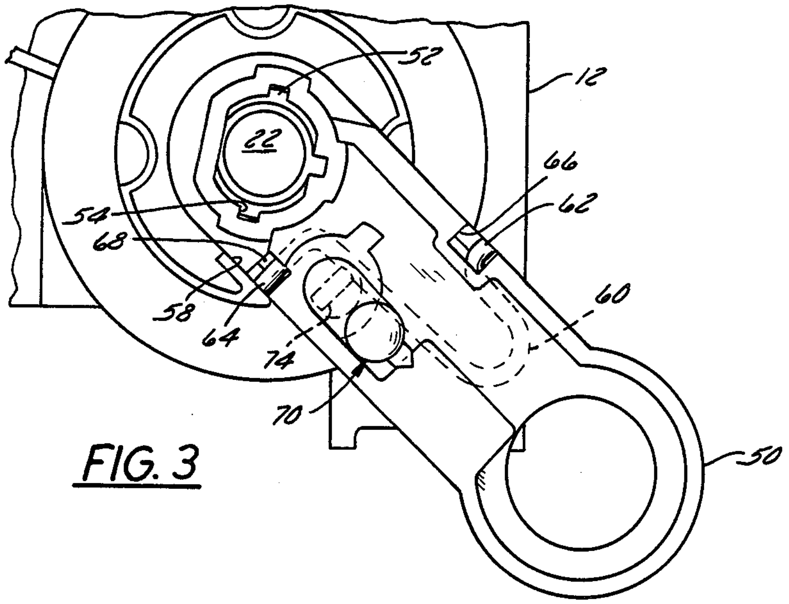
FIG. 3 is a view of the operating handle for the primary circuit breaker showing the external cam assembly in the shunt circuit open position.
Figure 4:
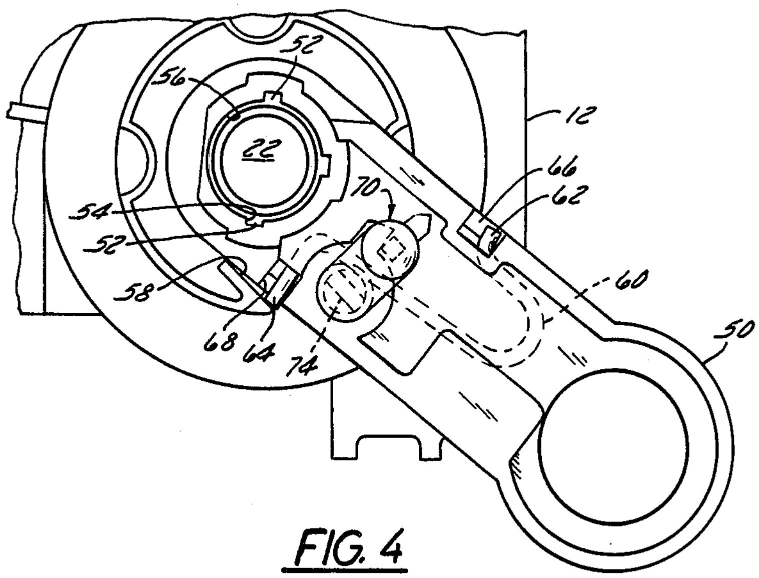
FIG. 4 is a view of the operating handle showing the cam assembly in the shunt circuit closed position.
Figure 5:
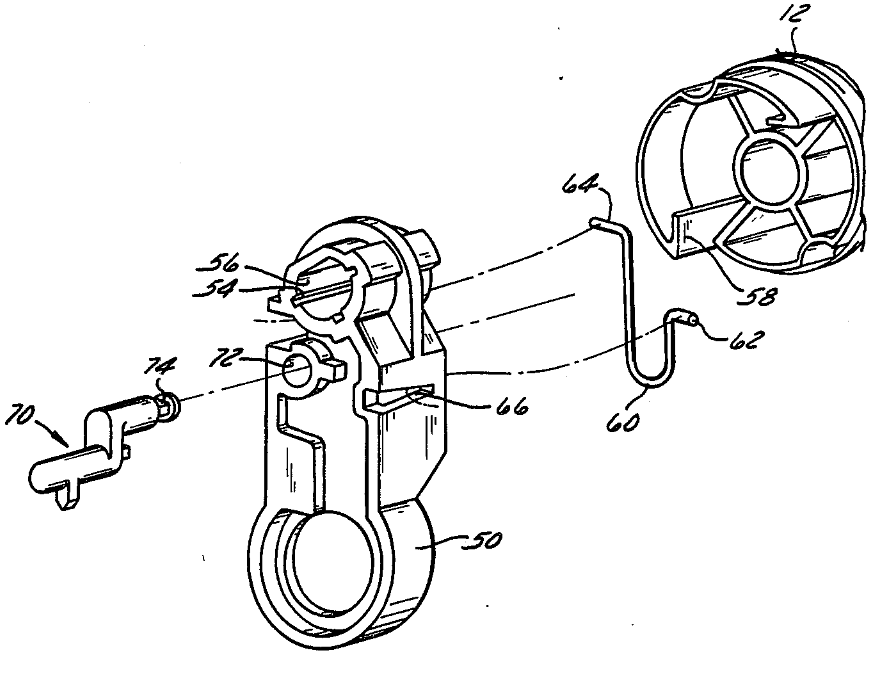
FIG. 5 is an exploded perspective view of the operating handle and cam assembly.
Figure 7:
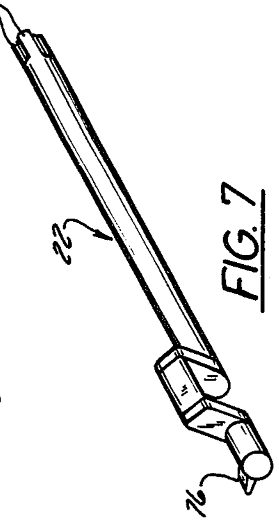
FIG. 7 is a perspective view of the crank shaft.
Figure 6:
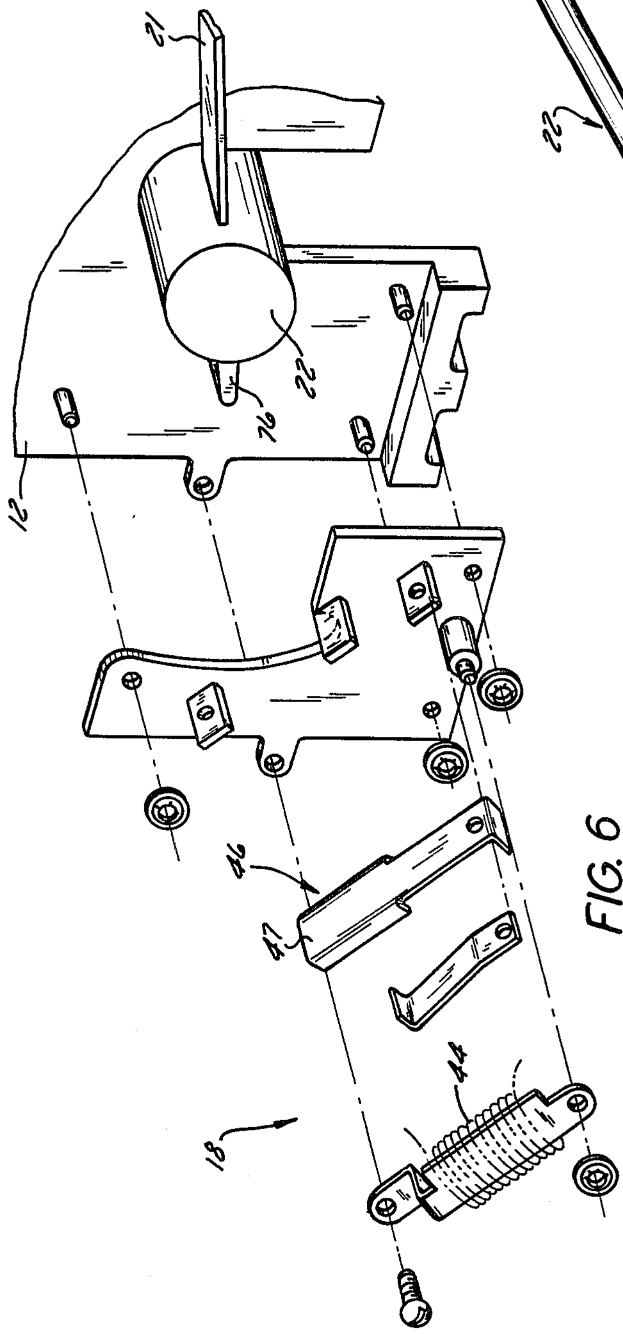
FIG. 6 is an exploded perspective view of the switch assembly for the shunt circuit.

The open and closed condition, of the switch 46 is controlled by means of a tab 76 mounted in the external operating handle 50 which is mounted on the end of the crank shaft 22 external to the transformer. The operating handle 50 is normally used to open or close the contacts 24 and 26 and to reset the latch mechanism 20 if tripped due to an overcurrent condition in the transformer. The handle 50 as seen in FIGS. 3, 4 and 5 is a molded plastic piece mounted on the end of the crank shaft 22 and fixed with respect thereto by means of splines 52 provided on the end of shaft 22 which mate with grooves 54 provided in an opening 56 in the handle 50. The switch 46 is opened or closed by means of a tab 76 formed as an integral part of the crankshaft 22.

The external handle 50 is normally rotated into engagement with a fixed stop 58 provided on the frame 12 as seen in FIG. 3. When the handle 50 engages the stop 58, the tab 76 will engage the movable element 47 opening the switch 46 as seen in FIG. 1. If the circuit breaker is to be set for emergency overload operation, the operating handle 50 is prevented from moving into engagement with the fixed stop 58 by means of a spring 60 located in the operating handle 50 so that the tab 76 cannot engage the switch element 47 as seen in FIG. 2.

In this regard, the spring 60 is in the form of a "V" and positioned in the operating handle 50 with one end 62 seated in a groove 66 in the operating handle and the opposite end 64 positioned in an opening 68 on the opposite side of the operating handle 50. The spring 60 is moved between normal and operating positions by means of a lever cam 70 positioned in an opening 72 in the operating handle 50. The cam lever 70 includes a cam 74 which is positioned to engage the spring 60. In the normal position as seen in FIG. 3 the lever 70 is rotated to a position where the edge of the cam 74 is in engagement with the spring with the end 64 of the spring pulled into the handle. On rotation of the lever 70 to the operating position as seen in FIG. 4, the spring 60 will move into engagement with the flat face of the cam 74 with the end 64 protruding outward a short distance from the edge of the handle. The end 64 will then engage the fixed stop 58 holding the operating handle away from the fixed stop approximately 5° to 10° so that tab 76 cannot engage the switch element 47.

Figure 8:
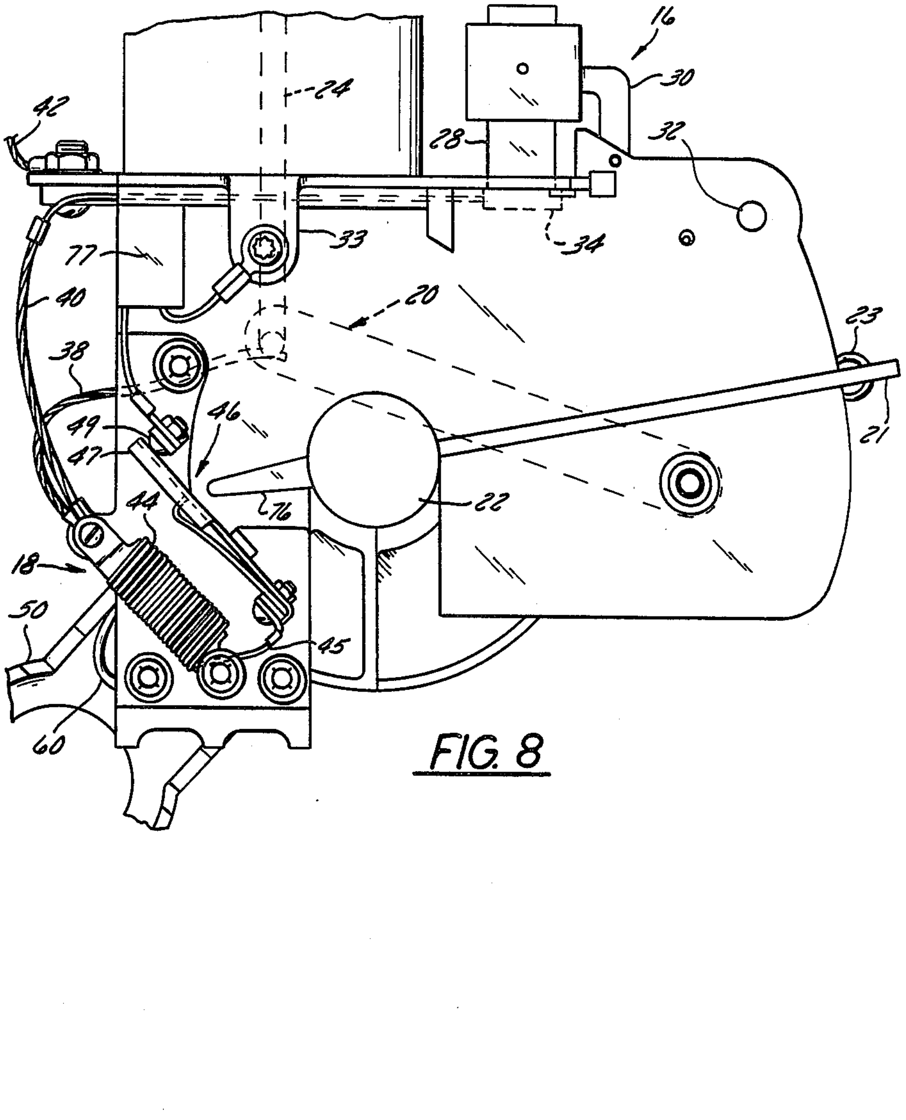
FIG. 8 is similar to FIG. 2, but includes a bimetal switch in the shunt circuit.
Figure 9:
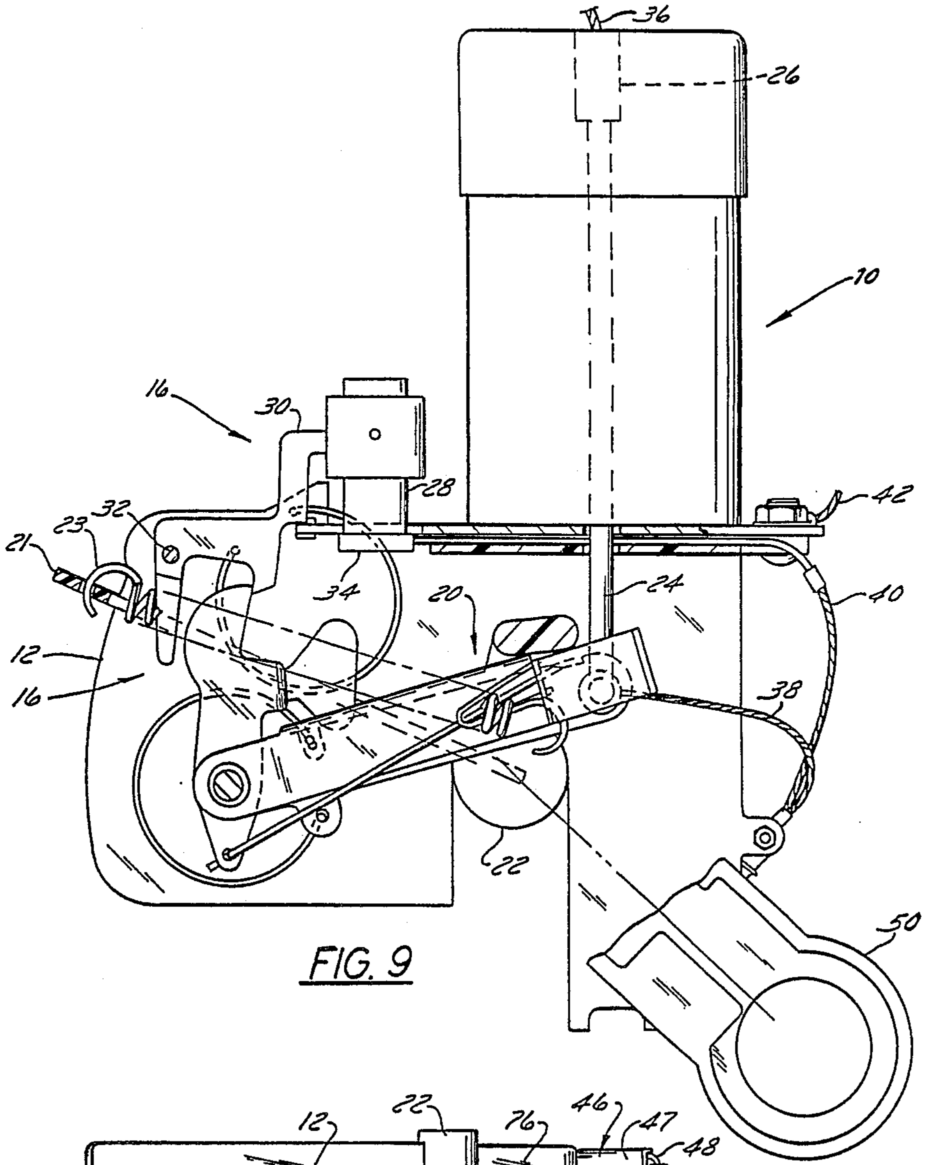
FIG. 9 is a side elevation view of a primary circuit breaker showing the trip mechanism.
Figure 10:
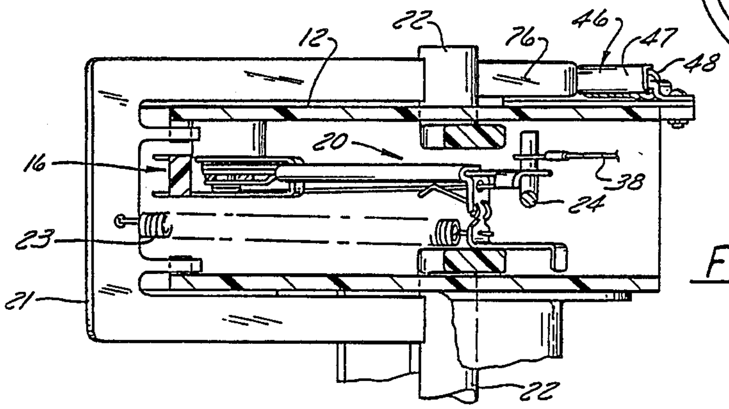
FIG. 10 is a view taken on line 10—10 of FIG. 9 showing the yoke.

In order to prevent excessive overload time of operation, temperature responsive means can be provided in the shunt circuit to open the shunt circuit at excessive temperatures. Such means is in the form of a bimetal switch 77 connected in line 48A as seen in FIG. 8. The bimetal switch 16 is a conventional switch manufactured by Portage Electric Products, Inc. of Mount Canton, Ohio. The bimetal switch 77 can be selected to be of the shunted type B where the bimetallic element does not carry any current, but responds only to the oil temperature. Alternatively, a bimetal switch of the conductive type C can be selected, where the element responds to the oil temperature and also heat due to the current flow when it is of relatively high value; this switch would reduce the time duration that higher fault currents could flow.

I claim:

1. In a primary circuit breaker for a transformer, said circuit breaker including a frame, a primary switch mounted on said frame for opening and closing the primary circuit, an operating handle mounted exteriorly of the transformer for opening and closing the primary switch, a trip mechanism operatively connected to open the primary switch under fault current conditions, the trip mechanism including a conductive metallic sensor element connected in the primary circuit and having a predetermined Curie temperature and a magnet mounted for movement into engagement with the sensor element and biased to open the primary switch when the temperature of the sensor element approaches the Curie temperature, the improvement comprising a shunt circuit connected to the primary circuit in parallel with said sensor element, a normally closed switch in said shunt circuit and means mounted in said operating handle for selectively opening said shunt circuit switch whereby a portion of said primary current will flow through said shunt circuit when said switch is closed.

2. The improvement according to claim 1 wherein said shunt circuit includes a resistance element for limiting the current passing through the shunt circuit to a percentage of the current in the primary circuit.

3. The improvement according to claims 1 or 2 wherein said opening means includes a spring for limiting the rotary motion of said operating handle and a tab mounted on said operating handle in a position to open said shunt circuit switch depending on the position of said operating handle.

4. The improvement according to the claims 1 or 2 wherein said shunt circuit includes a bimetal switch positioned to respond to the transformer oil temperature.

5. The improvement according to claims 1 or 2 including temperature responsive means in said shunt circuit for opening said shunt circuit at excessive temperatures.

6. In an underoil primary circuit breaker for a transformer, the circuit breaker including a magnetic, heat sensitive trip assembly for opening the circuit breaker, the assembly including a sensor element having a predetermined Curie temperature, the improvement comprising a shunt circuit assembly for bypassing a portion of the primary current passing through the sensor element for the trip assembly for emergency overload service, said shunt circuit assembly including a resistance element for controlling the proportion of current passing through the shunt circuit assembly and a shunt switch for opening and closing the shunt circuit assembly.

7. The shunt circuit assembly according to claim 6 including means operable externally of the transformer for selectively opening or closing said switch.

8. The shunt circuit assembly according to claims 6 or 7 including a bimetal switch operatively positioned to respond to the temperature of the oil in the transformer.

9. The shunt circuit assembly according to claims 6 or 7 including a bimetal switch positioned to respond to the temperature of the oil in the transformer and to current flow through the bimetal switch.

10. In a primary circuit breaker for a transformer of the type having a crank for opening and closing the primary circuit breaker and an operating handle mounted on said crank external to the transformer, a trip mechanism operatively connected to open the circuit breaker under fault current conditions, the trip mechanism including a sensor element connected in the primary circuit and a magnet mounted for movement into engagement with said element and biased to actuate the trip mechanism when the temperature of sensor element approaches the Curie temperature, the improvement comprising a shunt circuit connected across the sensor element, a switch in said shunt circuit, means in said shunt circuit for controlling the proportion of primary current bypassed through said shunt circuit, and means mounted in the operating handle for selectively opening and closing said shunt circuit switch.

11. The improvement according to claim 10 wherein said controlling means comprises a resistance element.

12. The improvement according to claim 10 or 11 wherein said opening and closing means comprises a tab mounted on the crank in a position to open and close said shunt circuit switch depending on the rotary position of the crank, said means in the operating handle limiting the rotary motion of the crank.

13. The shunt circuit assembly according to claims 10 or 11 including a bimetal switch connected to the shunt circuit and operatively positioned to respond to the temperature of the oil in the transformer to open the shunt circuit.

14. The shunt circuit assembly according to claims 10 or 11 including a bimetal switch connected to open said shunt circuit in response to a predetermined oil temperature or an increase in current.

* * * * *